Patented Aug. 14, 1945

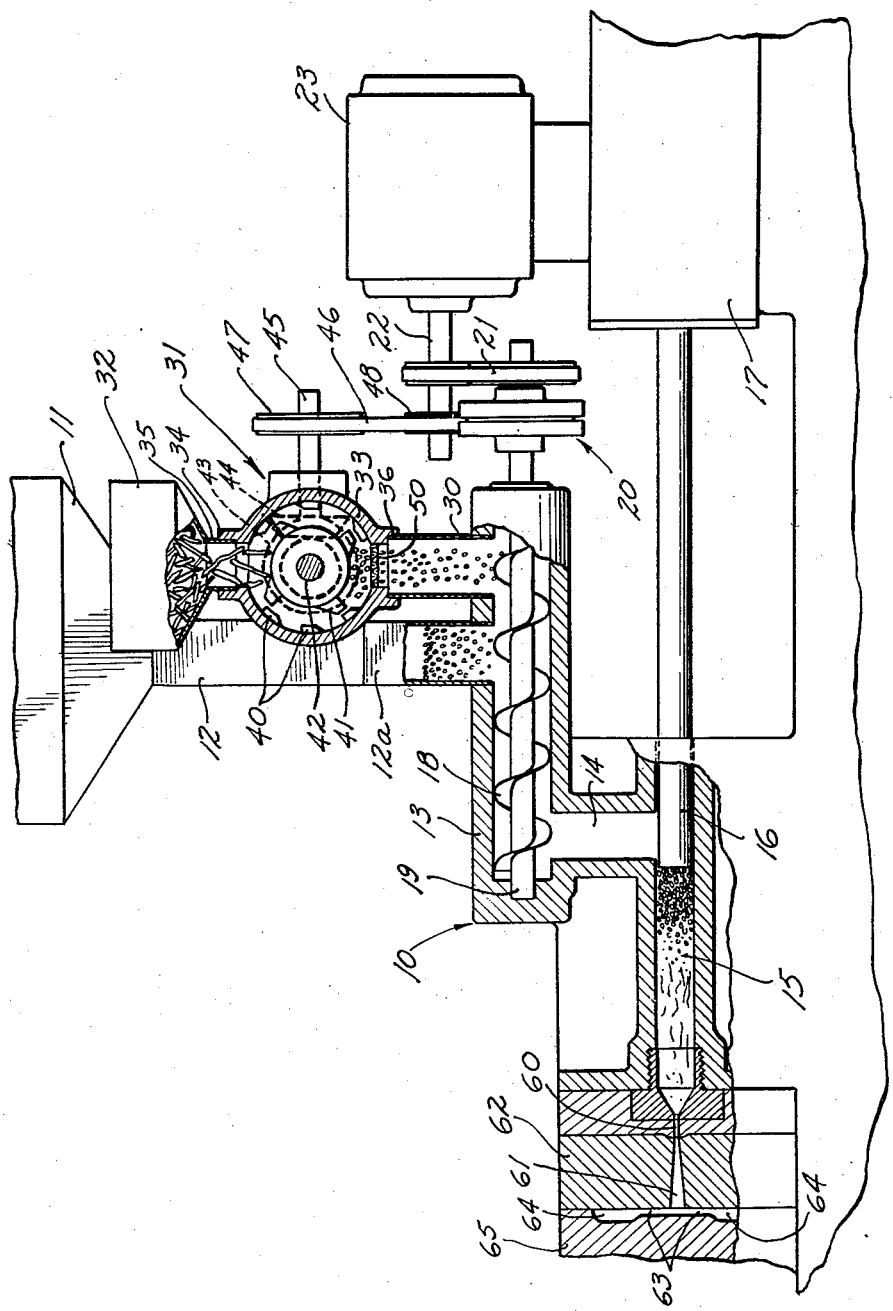

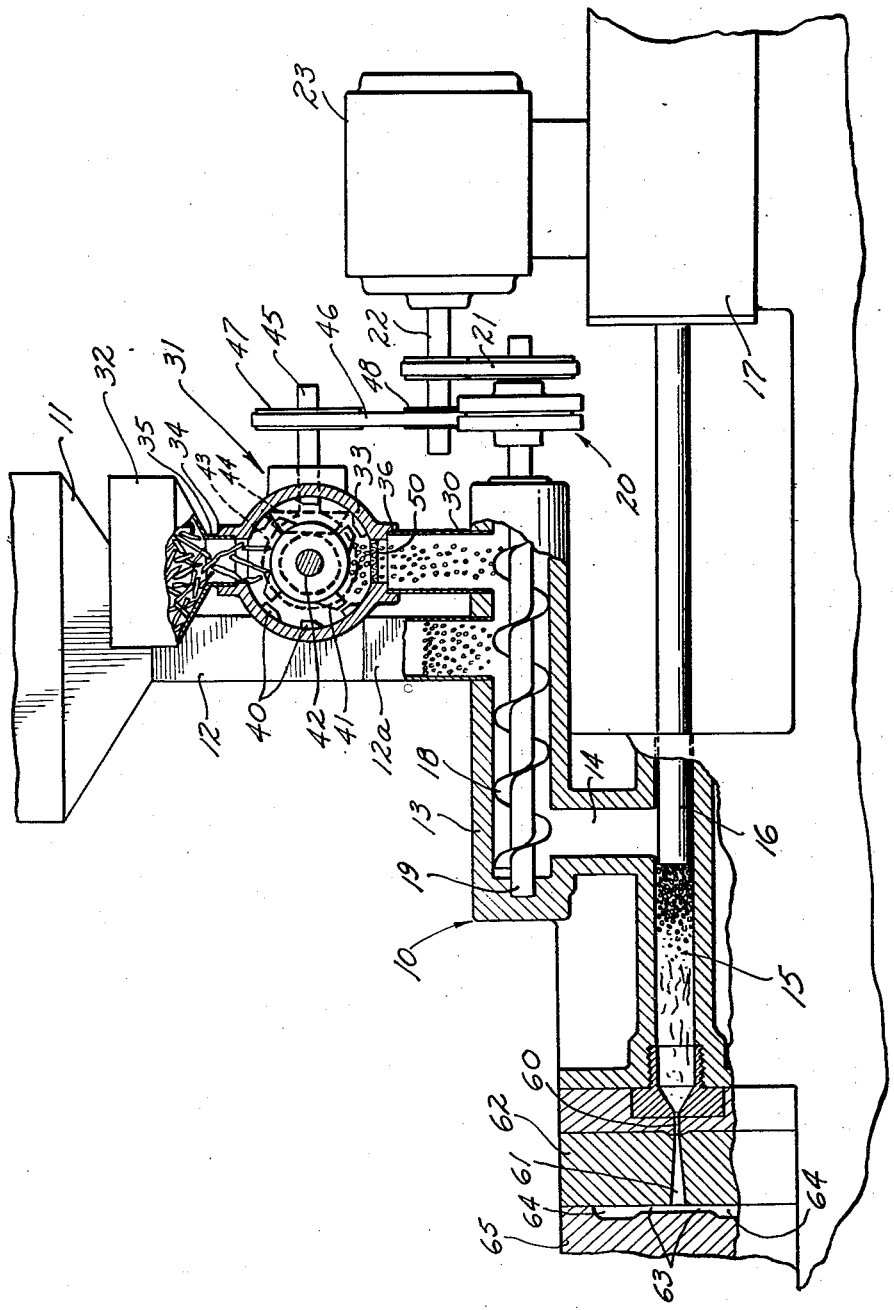

2,382,655

UNITED STATES PATENT OFFICE 2,382,655

AUXILIARY SCRAP FEED FOR PLASTIC MOLDING MACHINES

Warren O. Nichols, Los Angeles, Calif., assignor to Allied Plastics Company, Los Angeles, Calif., a copartnership comprised of Dwight C. Hirsh and Harry G. Long Application February 16, 1943, Serial No. 476,098

2 Claims. (Cl. 18—30)

This invention relates generally to plastic molding machines, and deals more particularly with an auxiliary feed means for such machines whereby scrap material may be fed directly into the machine.

Plastic molding operations yield a considerable proportion of scrap material. In addition to occasional defective products, the injection molding process produces certain parts which must be severed from the finished article. It is common to form the die with a plurality of article cavities clustered about and connected by way of small radial passageways with a centrally located channel into which the thermo-plastic material is injected from the injection cylinder. When the die is opened and the product removed therefrom, it consists of a plurality of articles interconnected by a central sprue and radial runners, which have been formed within the above-mentioned central channel and radial passageways leading to the die cavities. The finished articles are severed from the runners and sprue, and the latter becomes reclaimable scrap material.

The object of the present invention is the provision of simple and effective means by which this scrap material may be fed immediately back into the molding machine.

The scrap material mentioned is of such a nature that it could not be fed directly into the main feed hopper, along with the virgin granular thermoplastic material. In accordance with the present invention, a second or auxiliary hopper is provided for this scrap material, and this auxiliary hopper leads via a power-driven chopper to the same conveyor means that advances the virgin material from the main feed hopper toward the injection cylinder. The power-driven chopper is designed to chop the scrap material into a grain size adequately fine to be handled by the machine. The operator thus deposits the runners and sprue severed from the finished articles immediately into the auxiliary or scrap feed hopper, thereby reclaiming the scrap material without further handling.

Further objects and accomplishments of the invention involve the means by which the main and auxiliary hoppers both feed a common screw conveyor means, whereby assurance is always maintained that the full output of the chopper will be accepted by the screw conveyor, to the end that any possible choking of the hopper is avoided.

The invention will now be best understood by referring to the following detailed description of one illustrative embodiment thereof, reference for this purpose being had to the accompanying drawing, consisting of: a largely diagrammatic view, partly in section, and partly in elevation, of a portion of a plastic injection molding machine incorporating the present invention.

The improvements of the present invention may be incorporated in any conventional plastic molding machine, either of the extrusion or of the injection type, and since such machines are well known in the art, it will be unnecessary to disclose or describe a complete molding machine herein. Accordingly, I show in Fig. 1 of the drawing, entirely in diagrammatic form, so much of a typical molding machine as is necessary to illustrate the application thereof of the present invention. Moreover, since the application of the present invention is the same with the extrusion type of machine as with the injection type, it will be unnecessary to illustrate both herein, and I have accordingly chosen to illustrate the invention in connection with the injection type of machine, though without necessary or implied limitation thereto.

Numeral 10 designates generally a fragmentary portion of a typical injection molding machine, having main feed hopper 11, downwardly extending channel, conduit or chute 12, leading from the lower end of hopper 11, cylindrical screw conveyor chamber 13 receiving material from channel 12, outlet passageway 14 leading from one end of conveyor chamber 13, and heating and injection cylinder 15 arranged to receive material from passageway 14. Reciprocable within cylinder 15 is the usual feeding ram 16, operable in a conventional manner by means of a pressure piston, not illustrated, within work cylinder 17. Screw conveyor 18 within conveyor chamber 13 is on a shaft 19, here illustratively indicated as driven through magnetic clutch 20 and belt 21 from the shaft 22 of electric drive motor 23. Motor 23 operates continuously, and at the time in the operating cycle that the material is to be fed into cylinder 15, ram 16 being at such time in retracted position, magnetic clutch 20 is energized through automatic switching arrangement not necessary here to detail, thereby coupling the screw conveyor to motor 23 and effecting a feed of material from supply conduit 12 towards passageway 14, discharging into cylinder 15. Magnetic clutch remains energized for a predetermined time interval effecting a delivery of a predetermined charge of the material into cylinder 15, after which the clutch 20 is automatically de-energized, and the feeding operation of screw conveyor 18 is arrested. This magnetic clutch, if used, may be energized and deenergized at proper times through appropriate contacts incorporated in the electric timer conventionally provided in molding machines of the type in question, as will be readily understood by those skilled in the art. Any alternative means of well known or appropriate character for accomplishing intermittent feed of the material from supply conduit 12 to injection cylinder 15 may of course be substituted, the particular means for feeding the material forming no part of the present invention, and being subject to any desired work-out.

The plastic molding machine described in the foregoing is quite conventional, and merely illustrative of one typical type of machine to which the invention may be applied. A typical embodiment of the present invention, as applied to said illustrative molding machine, will now be described.

As will be noted in the drawing, the juncture of main feed conduit 12 with conveyor cylinder 13, is, in accordance with the invention, located at a point spaced somewhat from the rearward end of cylinder 13, and communicating with cylinder 13, at a point preferably rearwardly of the junction point between conduit 12 and cylinder 13, is an auxiliary feed conduit 30, the latter receiving chopped scrap material from a chopper generally designated as 31, and which receives such material from scrap feed hopper 32. The chopper is shown to comprise a housing 33 having an inlet 34 at the top, to which is joined the neck 35 of hopper 32, and an outlet 36 at the bottom joined to the upper end of conduit 30. Inlet 34 thus leads to the interior chopper 31 and outlet 36 passes the chopped material to conduit 30. Main feed conduit 12 may be arranged in any suitable manner so as to avoid interference with the chopper and auxiliary hopper 32; for instance, it may be arranged somewhat to the rear of the chopper, and may have a sloping offset section as at 12a. Housing 33 contains a set of stationary knives, indicated at 40, and cooperating therewith are a plurality of rotating knives 41 mounted on a central shaft 42 which is driven in any suitable manner; for instance, as here diagrammatically indicated, it may be driven through bevel gears 43 and 44 from a shaft 45, which is in turn driven from motor shaft 22 through belt 46 and suitable pulleys 47 and 48. A screen 50 of proper mesh, for instance ¼", is mounted in outlet 36, and prevents discharge of material until ground to the necessary degree of fineness.

In operation, the virgin granular thermoplastic material is fed into main feed hopper 11, and flows downwardly therefrom via conduit 12 to conveyor cylinder 13. At times of energization of magnetic clutch 20, screw conveyor 18 is rotated and feeds material so received into cylinder 13 toward and into discharge passageway 14, and this material, ram 16 being retracted from the position shown, enters injection cylinder 15, to be subsequently engaged by the ram and ejected via injection nozzle 60, channel 61 in die block 62, and radial passageways 63 to the die cavities 64 formed between separable die blocks 62 and 65. Any scrap material resulting from the process, either defective particles or material severed from the articles, is deposited as soon as obtained into scrap feed hopper 32, whence it descends into chopper 31 and is ground thereby to a degree of fineness suitable for commingling with the virgin granular material entering the machine via the main feed. As will be noted, the chopper is driven continuously from motor 23, and is so designed as to effectively chop the scrap material to the requisite degree of fineness. The chopped material passes screen 50 and is conveyed via conduit 30 to the rearward end of conveyor cylinder 13, whence it is fed forwardly by screw conveyor 18 and commingled with the material entering via conduit 12. The main feed conduit normally is filled with material from hopper 11, and hence tends to fill the bore of cylinder 13. If the auxiliary scrap feed conduit were to communicate with cylinder 13 between conduit 12 and the discharge end of the cylinder, some difficulty might therefore be encountered in that the cylinder would tend to be choked with material received from conduit 12 to such an extent that it could not readily accept the ground scrap. But by locating the scrap feed inlet to cylinder 13 rearwardly of the point at which material is fed into the cylinder from conduit 12, no such difficulty is encountered, and the conveyor cylinder accepts the material fed to it by both conduits 12 and 30, the conveyor screw 18 advancing the material received from the scrap feed and commingling it with the virgin material received from the main infeed. The amount of the latter material entering cylinder 13 is of course reduced to an extent just equal to the amount of ground scrap fed in via conduit 30. The improvements provided by the present invention greatly facilitate the handling of the reclaimable scrap material produced in plastic molding. The operator removes the finished product from the machine, immediately clips the runners and sprue from the finished articles, places the latter in a bin or on a conveyor belt, and deposits the runners and sprue into scrap feed hopper 32. The material is thus immediately re-run through the machine. The problem of handling the scrap output of the machine is thus solved in a most effective and efficient manner.

I claim:

1. In a plastic molding machine having a die cavity, a main infeed hopper, a cylindrical conveyer chamber having longitudinally spaced inlet and outlet openings, a screw conveyer in said chamber, a material passageway connecting said main infeed hopper with said infeed opening of said chamber, and a material passageway leading from said discharge opening of said chamber toward said die cavity; an auxiliary infeed hopper for scrap material, chopper means for chopping material fed into said auxiliary hopper to a predetermined degree of fineness, and a material passageway for conveying chopped material from said chopping means to said conveyer chamber, at a point spaced beyond said inlet opening from said outlet opening.

2. In a plastic molding machine, a cylindrical conveyer chamber formed with longitudinally spaced main intake and discharge openings, and with an auxiliary intake opening spaced beyond said main intake opening from said discharge opening, said main intake opening being adapted to receive virgin thermoplastic material, a screw conveyer in said chamber, an infeed means for scrap material, chopping means for chopping material fed into said infeed means, and a passageway for conveying material chopped by said chopping means to said auxiliary intake opening in said chamber.

WARREN O. NICHOLS.